Nov. 10, 1925.
G. SCHREINER
1,561,360
HORSE COLLAR AND HAME
Filed May 14, 1925
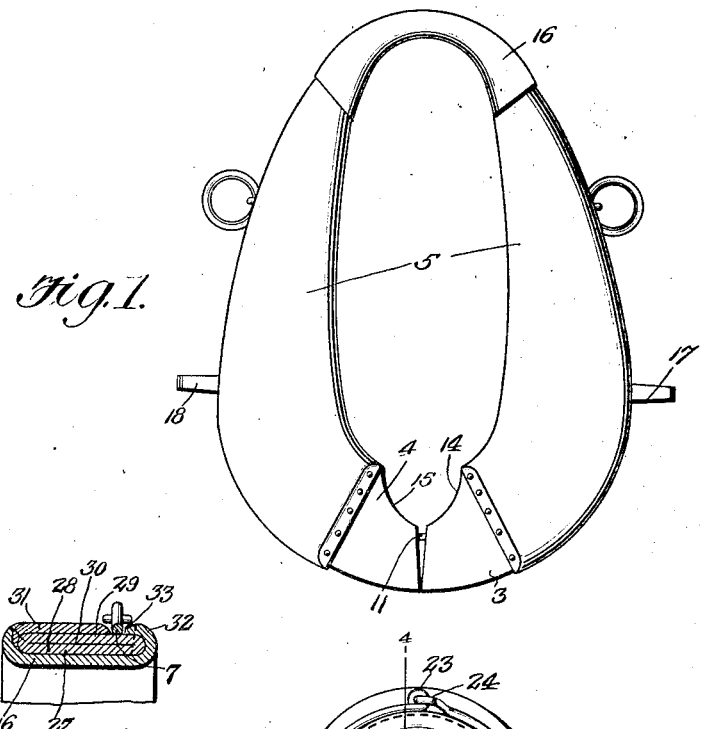
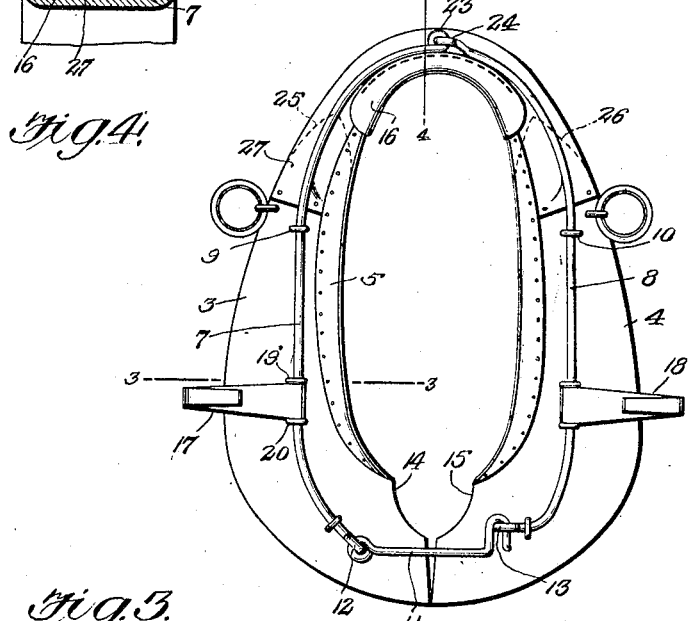
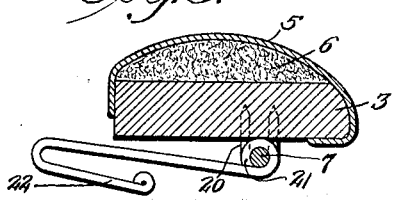
Inventor
George Schreiner
By Wilkinson & Giusta
Attorneys.

Patented Nov. 10, 1925.

1,561,360

UNITED STATES PATENT OFFICE.

GEORGE SCHREINER, OF NEW ORLEANS, LOUISIANA.

HORSE COLLAR AND HAME.

Application filed May 14, 1925. Serial No. 30,349.

*To all whom it may concern:*

Be it known that I, GEORGE SCHREINER, a citizen of the United States, residing at New Orleans, in the parish of Orleans and State of Louisiana, have invented certain new and useful Improvements in Horse Collars and Hames; and I do hereby declare the following to be a full, clear, and exact description of the invention, such as will enable others skilled in the art to which it appertains to make and use the same.

The present invention relates to improvements in horse collars and hames combined and has for an object to provide an improved horse collar and means thereon for receiving the hames whereby to form a composite structure.

The invention also provides for ease in placing and removing the collar and in securing the harness while obviating chafing of the neck of the animal.

With the foregoing and other objects in view, the invention will be more fully described hereinafter, and will be more particularly pointed out in the claims appended hereto.

In the drawings, wherein like symbols refer to like or corresponding parts throughout the several views,—

Figure 1 is a front elevation of the improved device.

Figure 2 is a rear elevation,

Figure 3 is a section taken through one of the collar members, and

Figure 4 is a cross section taken on the line 4—4 in Figure 2.

Referring more particularly to the drawings the collar is made up of the two members 3 and 4 preferably of flat pieces of wood covered on one side by the leather 5 shown in Figure 3, which is stuffed or padded as indicated at 6. The leather is received against the animal's neck while the opposite wooden faces are adapted to receive the hame members 7 and 8 mounted in the staples or eyelets 9 and 10 secured conveniently to the wooden collar 3 and 4. The collar members and the hames are separated at their lower ends and both collar and hames are secured together by the hook 11 which is swivelly connected with the eyelet 12 at the bottom of the hame rod or member 7 and removably engages with the eyelet 13 at the bottom of the companion hame rod or member 8.

At the base of the neck opening of the collar are the half moon shaped cut away portions 14 and 15 fitting about the throat of the animal to avoid chafing and soreness. The wooden collar members 3 and 4 are reduced at their upper ends and pointed as indicated at 25 and 26. These wooden members terminate short of the upper portion of the collar and the upper pointed ends of the wooden members are secured together by the leather strip 27 made as indicated in Figure 4 and having the overlapped side portions 28 and 29 meeting centrally as indicated at 30. The construction therefore forms a tubular arrangement, the overlapped side portions 28 and 29 being in contact at the uppermost portion of the collar but the tubular leather being opened out and enveloping the pointed ends 25 and 26 of the upper wooden members of the collar.

The leather is attached by means of nails or other appropriate fastenings in the manner indicated. The upper faces of this tubular leather neck portion are reinforced and concealed by the leather top strip 31 shown in Figure 4 which is stitched or otherwise secured to the tubular leather. This top strip 31 terminates short of the front edge of the tubular leather and a yoke piece 16 of leather or other appropriate material is fitted within the upper portion of the collar and beneath the tubular leather neck portion 27. The yoke 16 is wide enough to permit its ends to overlap the sides of the tubular neck piece 27 and one edge of said yoke piece is stitched to the strip 31. The other edge 32 terminates short of the adjacent edge of the strip 31 to provide the channel 33 in which the upper ends of the hame rods 7 and 8 lie. The arrangement holds the rod in place.

The hame hooks are indicated at 17 and 18 and they are situated between the staples 19 and 20 acting also to hold the hame rods or members in place on the wooden parts of the collar. The hame hooks are preferably made of wrought iron with one end rolled about the hame rod as indicated at 21 in Figure 3, while the outer ends of the hame hooks are overturned upon the main body portions of the hooks whereby to provide bills 22. The upper ends of the hame rods are provided with intermeshing eyes 23 and 24 made by looping the ends of the members through one another.

The hinge joint is accordingly formed which reinforces the flexible leather members, 27, 31 and 16. On releasing the hook 11 at the bottom of the members both the hame and the collar may be simultaneously expanded or opened out in the act of placing or removing the collar.

The invention provides a durable, strong yet simple arrangement of the collar and hames and one which permits of ready mounting and removal.

It is obvious that various changes and modifications may be made in the details of construction and design of the above specifically described embodiment of this invention without departing from the spirit thereof, such changes and modifications being restricted only by the scope of the following claims.

What is claimed is—

1. A combined horse collar and hames comprising padded and leather faced collar members open at the lower ends thereof and terminating short of the upper end of the collar, a flexible leather member for securing the upper ends of the collar members together, a flexible yoke piece secured to said last mentioned member and forming a shoulder at one side thereof, hame members secured to the collar members and flexibly joined together at their upper ends, the upper portions of said hame members being confined by the shoulder of said yoke member, and means at the lower ends of said hame members for releasably holding said hame and collar members together.

2. A combined horse collar and hames comprising collar members adapted to open at their lower ends and having their upper ends terminating short of the top part of the collar, a tubular flexible piece engaged about the upper ends of said collar members for flexibly joining the same together, a flexible strip secured over said piece and terminating short at one side thereof, a flexible yoke piece secured to said first mentioned piece and having one edge extending up over the side of the piece and forming a trough with said strip, hame rods secured to said collar members and having their upper ends lying in said trough, the upper ends of said members being hinged together, and means for releasably connecting the lower ends of said hame members.

3. A combined horse collar and hames comprising collar members pointed at their upper ends and having their lower ends separable, a tubular flexible piece enveloping the pointed ends of said members and secured thereto, a flexible strip secured to the upper side of said piece and terminating short of one edge thereof, a flexible yoke surrounding said piece having its edges lapped up over the sides of said piece and terminating short of one edge of said strip to form a trough therebetween, hame rods flexibly joined at their upper ends disposed in said trough, means to hold said hame rods to the collar members, and a hook for releasably holding the lower ends of the hame rods and collar members together.

GEORGE SCHREINER.